US010078655B2

(12) United States Patent
Debiec et al.

(10) Patent No.: US 10,078,655 B2
(45) Date of Patent: Sep. 18, 2018

(54) RECONCILING SENSOR DATA IN A DATABASE

(71) Applicant: International Business Machines Corporation, Armonk, NY (US)

(72) Inventors: Lukasz Debiec, Modlnica (PL); Ivo Modrinic, Kraków (PL); Tomasz Niebielski, Kraków (PL); Wojciech Wojcik, Bochnia (PL)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 14/867,542

(22) Filed: Sep. 28, 2015

(65) Prior Publication Data

US 2017/0091252 A1    Mar. 30, 2017

(51) Int. Cl.
*G06F 17/30*    (2006.01)

(52) U.S. Cl.
CPC .. *G06F 17/30368* (2013.01); *G06F 17/30371* (2013.01)

(58) Field of Classification Search
None
See application file for complete search history.

(56) References Cited

U.S. PATENT DOCUMENTS

| 7,982,603 | B2* | 7/2011 | Moriwaki | H04L 67/12 340/531 |
| 8,166,002 | B2 | 4/2012 | Robinson et al. | |
| 8,712,979 | B2 | 4/2014 | Morozov et al. | |
| 8,909,869 | B2* | 12/2014 | Murakami | G06F 12/0875 711/118 |
| 9,293,029 | B2* | 3/2016 | Coyne | G08B 23/00 |
| 9,756,491 | B2* | 9/2017 | Virhia | G06Q 10/00 |
| 2009/0276525 | A1* | 11/2009 | Jo | H04L 67/2823 709/224 |
| 2012/0197852 | A1 | 8/2012 | Dutta et al. | |
| 2014/0114709 | A1 | 4/2014 | Olsen et al. | |
| 2016/0034329 | A1* | 2/2016 | Larson | G01D 21/02 702/188 |
| 2016/0370338 | A1* | 12/2016 | Sayfan | G01N 33/0062 |
| 2017/0026858 | A1* | 1/2017 | McKee | H04W 4/005 |
| 2018/0098022 | A1* | 4/2018 | Miner | G11B 27/30 |

* cited by examiner

*Primary Examiner* — Debbie Le
(74) *Attorney, Agent, or Firm* — Erik K. Johnson; Reza Sarbakhsh

(57) ABSTRACT

A computer-implemented method for storing and reconciling in a database sensor data from a plurality of sensors, the method comprising: repetitively receiving data sets for the plurality of sensors, each data set comprising sensor data detected by at least one of the plurality of sensors from a source during a sensing event, wherein a source identifier identifies the source, a sensor identifier identifies the at least one of the plurality of sensors, and wherein the sensor identifiers of at least two of the received data sets are different from each other, while both data sets comprise the same source identifier.

19 Claims, 6 Drawing Sheets

RECONCILING SENSOR DATA IN A DATABASE

BACKGROUND

The present invention relates generally to the field of computing, and more specifically, to storing and reconciling sensor data.

When an arbitrary environment is observed by a plurality of sensors, the sensors may have limited and varying visions. Some sensors may even have overlapping visions, i.e. they may detect sensor data from identical sources. Due to different detection parameters, e.g. time of detection or resolution, sensors with overlapping vision may provide different and even contradicting sensor data from the same source. This may lead to problems with handling large data volumes provided by a plurality of sensors with different levels of reliability, when comparing the same source with different sensor data from different sensors.

SUMMARY

In one aspect, the invention relates to a computer-implemented method for storing and reconciling, in a database sensor, data from a plurality of sensors. The method comprising: repetitively receiving data sets for each of the sensors. Each data set comprising sensor data detected by the respective sensor from a source during a sensing event, a source identifier identifying the source, and a sensor identifier identifying the respective sensor. The sensor identifiers of at least two of the received data sets are different from each other, while both data sets comprise the same source identifier. For each of the received data sets, the method further comprises: storing the sensor data comprised by the data set in a storage entry of the database in association with the source identifier and the sensor identifier, searching the database for a storage entry to be deleted according to a predefined criterion based on the reliability of the sensor identified by the sensor identifier using the sensor data and the source identifier, and if a storage entry to be deleted according to the criterion is found, deleting the respective storage entry.

In a further aspect, the invention relates to a computer system for storing and reconciling in a database sensor data from a plurality of sensors. The system comprising: a database, a memory with machine executable instructions stored therein, and a processor for executing the machine executable instructions. Execution of the machine executable instructions by the processor causes the processor to control the database by executing a data storing and reconciling method. The method comprises: repetitively receiving data sets for each of the sensors. Each data set comprises sensor data detected by the respective sensor from a source during a sensing event, a source identifier identifying the source, and a sensor identifier identifying the respective sensor. The sensor identifiers of at least two of the received data sets are different from each other, while both data sets comprise the same source identifier. For each of the received data sets, the method further comprises: storing the sensor data comprised by the data set in a storage entry of the database in association with the source identifier and the sensor identifier, searching the database for a storage entry to be deleted according to a predefined criterion based on the reliability of the sensor identified by the sensor identifier using the sensor data and the source identifier, and if a storage entry to be deleted according to the criterion is found, deleting the respective storage entry.

In a further aspect, the invention relates to a computer program product for storing and reconciling in a database sensor data from a plurality of sensors. The computer program product comprises a computer readable storage medium having machine executable instructions embodied therewith. The machine executable instructions are executable by a processor to cause the processor to control a database according to a data storing and reconciling method. The method comprises: repetitively receiving data sets for each of the sensors. Each data set comprises sensor data detected by the respective sensor from a source during a sensing event, a source identifier identifying the source, and a sensor identifier identifying the respective sensor. The sensor identifiers of at least two of the received data sets are different from each other, while both data sets comprise the same source identifier. For each of the received data sets, the method further comprises: storing the sensor data comprised by the data set in a storage entry of the database in association with the source identifier and the sensor identifier, searching the database for a storage entry to be deleted according to a predefined criterion based on the reliability of the sensor identified by the sensor identifier using the sensor data and the source identifier, and if a storage entry to be deleted according to the criterion is found, deleting the respective storage entry.

Embodiments of the invention are given in the dependent claims. Embodiments of the present invention can be freely combined with each other if they are not mutually exclusive.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Figure 1:
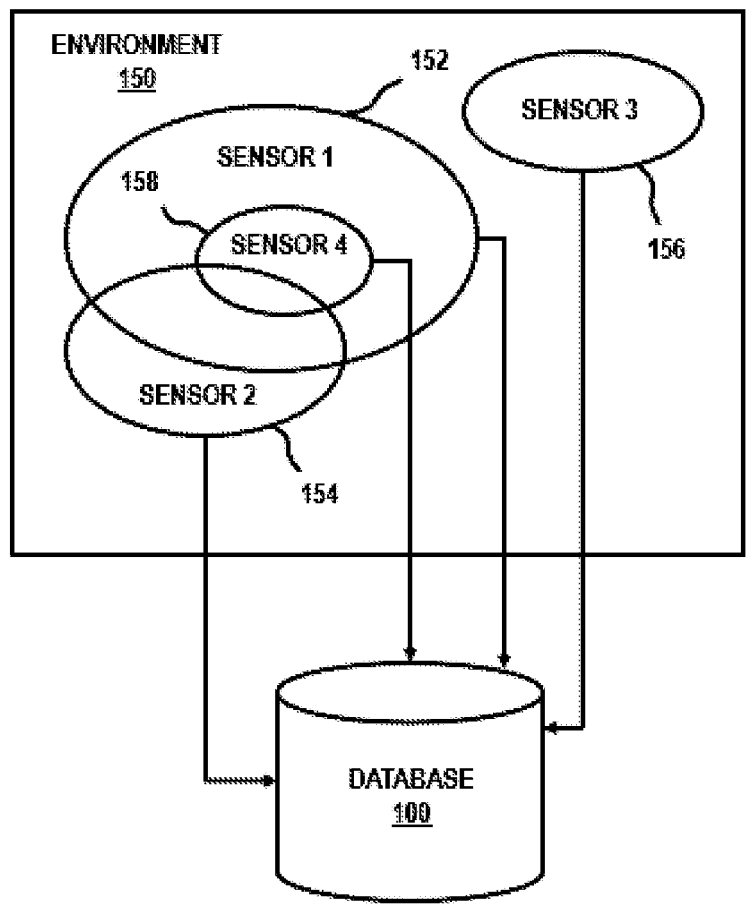
FIG. 1 depicts a schematic diagram illustrating an exemplary arrangement with a plurality of sensors providing sensor data to a database.

A 'database' as used herein encompasses a data file or repository which contains data that may be accessed by a processor. Examples of databases are, but are not limited to: a data file, a relational database, a file system folder containing data files, and a spreadsheet file.

According to embodiments the database may be configured to store received sensor data from each source in a storage entry, to assign a source identifier to each storage entry identifying for the sensor data stored in the storage entry the source from which the sensor data originates, and to assign one or more sensor identifiers to each storage entry, each sensor identifier identifying one of the sensors from which sensor data assigned with the respective source identifier has been received and stored in the respective storage entry. Thereby each storage entry may be assigned to one source and one or more sensors.

A 'sensor' as used herein refers to a transducer whose purpose is to sense, i.e. detect, some characteristic of its environment. The sensor receives a signal from a source which is part of its environment in form of energy. The signal may for example be due to an event change in quantities in the environment. Energy types may include, but are not limited to: electromechanical, electromagnetic, chemical, acoustic, and thermal energy. The sensor converts a received signal in form of one energy into another signal. In general, the resulting signal which is provided by the sensor as an output is provided in another form of energy. Without limitation, the sensor may provide an output signal in the form of the same type of energy as the input signal, but in a modified form. In particular, any variable attenuation of energy may serve as an input. The output may for example be provided as an electrical or optical signal.

A 'sensing field' as used herein refers to the view of the sensor, i.e. to a portion of environment of a sensor comprising all signal sources detectable by the sensor. In other words, the sensing field may be defined as the sum of all sources from which the sensor, due to its configuration, is enabled to receive an input signal and for which the sensor provides an output signal in case of receiving a respective input signal.

'Sensor data' is data generated by the sensor by transforming an input signal into an output signal, wherein the output signal comprises the sensor data. Sensor data according to the present disclosure may further comprise data which has been generated by further processing the original output signal provided by a sensor.

A 'data set' received for a sensor as used herein may refer to any kind of data provided by a sensor, characterizing the sensor and/or characterizing data provided by the sensor. It may at least comprise a sensor identifier identifying the respective sensor. It may comprise sensor data detected by the respective sensor during a sensing event, i.e. data comprised by an output signal of the sensor generated by the sensor by converting an input signal. Without limitation, a data set refers to any logical and/or physical combination of data. A combination of data comprising a plurality of sensor data detected during different sensing events may constitute a plurality of data sets, each data set comprising the sensor data detected during the same sensing event. With the sensor data detected by a sensor during the same sensing event being comprised by the same data set, each of the resulting data sets may be uniquely assigned to one sensor and one sensing event. A data set may be transmitted as one data package or as a plurality of data packages. A data set may further comprise a source identifier identifying the source of sensor data, for a plurality of sensor data the data set may comprise a plurality of source identifiers identifying the source of each sensor data. A data set may comprise a sensor identifier identifying a sensor, all sensor data detected by the respective sensor during a given sensing event as well as the source identifiers of the sources of all the sensor data, each of the plurality of sensor data being assigned with one of the source identifier identifying the source of the respective sensor data.

Data sets for each of the sensors are received repetitively, i.e. more than once. Thus, changes of sensor data may be tracked.

A 'sensing event' as used herein may refer to the conversion of an input signal into an output signal by a sensor. The input signal may be one or more signal values received at a certain point of time or an input received over time. It may also refer to a plurality of input signals, which are combined to a common output signal in the course of the conversion. The input signals may originate from a plurality of sources resulting in a plurality of sensor data, each sensor data being sensor data from one of the sources.

A 'sensor identifier' as used herein may refer to a unique identifier, which is assigned to a sensor and identifies the same unambiguously.

A 'source identifier' as used herein may refer a unique identifier unambiguously identifying the source of sensor data, i.e. the source of the input signal from which the sensor data are generated by the sensor converting the respective input signal in an output signal. Without limitation, source of the sensor data may for example be identified by a characteristic of the input signal received by the sensor, i.e. the type of energy, the information content, the spatial origin or by the time of receipt.

Two sensors have overlapping sensing fields when they are configured such that they are enabled to receive signals from the same source. The larger the number of sources potentially seen by both sensors, the larger is the overlap. Nevertheless, two sensors with overlapping sensing fields do not necessarily provide identical sensor data for the same source due to different sensitivities and/or different detection times.

A 'storage entry' as used herein may refer to a portion of a data file or repository which is temporarily or permanently stored in a database which may contain data to be accessed by a processor. A storage entry may be configured such that it comprises sensor data detected by a sensor from a source during a sensing event, one assignment of a source identifier, and one or more assignments of sensor identifiers. Thus, a storage entry may be assigned with one source identifier, but with more than one sensor identifiers.

The 'reliability' of a sensor as used herein refers to the size of the sensing field of a sensor, e.g. the number of sources from which a sensor may receive input signals due to its configuration. Thus, it refers to the sensitivity of a sensor. It furthermore refers to the probability that a malfunction of the sensor may occur. A malfunction may comprise generating an output signal without receiving a corresponding input signal, not generating an output signal although an input signal is provided, as well as erroneous conversion of an input signal into an output signal. It may even refer to the probability of a total failure of the sensor.

According to embodiments of the present invention, every sensor data received is stored in the database. Thus, no pre-selection of the received sensor data is performed. This may have the advantage that the database always contains up-to-date data, i.e. the latest sensor data received.

Sensor data from a sensor may for example be received randomly, i.e. in random intervals, for example triggered by randomly occurring events. Sensor data may be received in predefined time intervals, in particular, equidistant time intervals. According to an embodiment, the receipt of sensor data may be triggered by a request sent to a sensor.

The deletion of storage entries may be advantageous in that the amount of data stored in the database is prevented from becoming too large, even though every sensor data received is initially stored, i.e. taken into account. Thereby, the required storage volume to be provided by the database may be reduced compared to a scenario without any data deletion. A smaller volume of stored data further allows faster searching of the database as well as faster access to stored data.

A further advantage may be that due to the reliability criterion which is applied, when deleting data from the database, the quality and reliability of the remaining sensor data which is kept in the storage is improved. Only sensor data of sensors with a high level of reliability may be kept, while sensor data from sensors with a low level of reliability is deleted. Further, the deletion based on the reliability of the sensor may accelerate the deletion, e.g. in case a highly reliable sensor indicates, that a storage entry is outdated, i.e. the respective sensor data stored therein does not accurately resemble the actual state of the source to be detected by the sensors.

Finally, since the data set just received is taken into account in order to decide whether there are storage entries in the database to be deleted, it may be ensured that only those storage entries are deleted with sensor data which cannot be reliably detected by sensors anymore.

According to an example, a searching of the database for a storage entry to be deleted according to a predefined criterion based on the reliability of a sensor may not only be triggered by a receipt of a data set comprising a sensor identifier identifying the respective sensor, but by other triggers as well, e.g. the expiring of a predefined interval of time without receiving any data set for the respective sensor. This may for example be advantageous in case the sending and receiving of sensor data is triggered by the occurrence of a corresponding event, from which the data sensor originates. From the absence of a data set to be provided by a reliable sensor, it may be concluded that the sensor data received and stored before cannot be detected anymore, i.e. the respective signal source is now absent.

According to embodiments, storing the sensor data comprises: searching the database for a storage entry assigned with the source identifier, if no storage entry assigned with the source identifier is found, generating a new storage entry, the sensor data being stored in the new storage entry and the source identifier as well as the sensor identifier being assigned to the new storage entry, whereby if a storage entry assigned with the source identifier is found, checking whether the respective storage entry is assigned with the sensor identifier, if the respective storage entry is assigned with the sensor identifier, updating the respective storage entry with the sensor data, and if the respective storage entry is not assigned with the sensor identifier, updating the respective storage entry with the sensor data and adding an assignment of the sensor identifier to the updated storage entry.

Thus, in case the received source identifier identifies a source from which no sensor data has been stored in the database yet, i.e. the database comprises no storage entry assigned with the respective source identifier, a new storage entry for the sensor data from the respective new source is generated. In case the source identifier identifies a source from which sensor data is already stored in the database, the respective sensor data stored in the database is updated with, i.e. replaced by, the received sensor data. In case the updated storage entry is not yet assigned with the sensor identifier of the sensor which has detected the received sensor data, the respective sensor identifier is assigned to the updated storage entry additionally, i.e. in addition to sensor identifier assignments previously assigned the updated storage entry. Thus, the latter case results in storage entry assigned with more than one sensor identifier.

This may have the advantage that even though every sensor data received is stored in the database, the database may only comprise one sensor data per source. Thus, conflicts due to possibly contradicting sensor data may be prevented. Furthermore, the amount of stored data may be limited. When sensor data from a certain source is updated with sensor data from the same source detected by another sensor, the sensor identifier which has not been assigned to the respective storage entry yet, the respective sensor identifier is added, i.e. additionally assigned to the respective storage. Thus, it may be tracked from which sensors sensor data of a certain source has been detected and received.

Furthermore, this method may have the advantage that it allows partial updating of data: In case sensor data is received originating a from source, for which sensor data has already been received before from another sensor, the newly received sensor data is used to update the sensor data stored in the database. However, only the sensor data originating from the same source is updated. Sensor data which has been received for the other sensor from other sources before is not updated or otherwise modified. Thus, a partially updating of sensor data received from a certain sensor before may be implemented. This updating may be implemented even without establishing any preference of the sensors.

Considering an arbitrary environment being observed by a plurality of sensors, each sensor may have a sensing field which may vary over time. The sensing fields may comprise one or more sources from which an input signal is detected and corresponding sensor data provided by the respective sensor. The sensor data of the sensors may be provided to and received by the database repetitively in random order and at random intervals. Some or all of the sensors' sensing fields may overlap with each other. As a result, sensor data from the same source may be provided by different sensors.

The present method allows determining when sensor data of a certain source is no longer observed and may be safely deleted. The method further allows a proper handling of change history so that partial updates coming from different sensors are not lost.

According to the present invention sensor data is stored along with identifier identifying the origin of the sensor data: The sensor identifier identifies the sensor which has detected the respective sensor data. The source identifier identifies the source of the respective sensor data, i.e. the object of detection for which the sensor data has been detected.

Every sensor may be uniquely identified by a sensor identifier. The sensor identifier may for example be a random universally unique identifier (UUID) value.

The sensor identifier may for example be stored in the form of a sensor id tag list. The list comprises sensor identifiers of sensors that recently reported sensor data for a given source. This approach allows handling correctly both sensor data deletion and sensor data updates, in particular partial sensor data updates.

The sensor data may for example be provided in the form of a vector of sensor data, e.g. a data row. The data row may be uniquely identified by a source identifier identifying the source of the respective sensor data. The source identifier may for example be a non-random UUID value. In one embodiment, this UUID value may for example be computed based on other sensor data.

The sensing field of each sensor may change dynamically, i.e. it may both extend and shrink. In other words, a given sensor may over time detect more or less sensor data from more or less sources, i.e. gather more or less information. These changes may occur randomly. They may be due to the changes of the environment observed by the sensor or due to changes of the sensor itself, like e.g. its orientation or sensitivity.

In case a sensor stops detecting data for a certain source, this may either be due to a narrowing of the sensor's sensing field because of an actual removal of the respective data source or a narrowing/shifting of the sensor's sensing field because of a change of the sensor's setting. Such a change of setting may for example be given by a change of orientation or focusing of the sensor or a revocation of security permissions.

The present method may have the advantage that none of the received sensor data is discarded in advance, but rather every sensor data received is initially stored in the database.

In contrast, a data storing based on prioritization rules for the sensors may lead to a missing of partial updates when data from a sensor with a lower priority is generally discarded. If data from a sensor with higher priority was already stored, incoming data from a current sensor with lower priority is not stored at all. Consequently, data would not be updated as frequently as it is reported by the sensors. Such a prioritization would require applying a strong ordering of the sensors, based on their sensing fields and may only work for sensors with nested sensing fields, i.e. sensors with higher priority sense all the data sources sensed by the sensors with lower priority.

According to an embodiment, each storage entry may be provided with a tag list comprising all sensor identifier assigned to the storage entry. Considering a sensor with sensor identifier 'sensor_id' reporting new sets of sensor data with source identifiers '[source_id1, source_id2, source_id3, . . . , source_idm]'. The newly received sensor data may be stored in the database according to the following algorithm:

For each incoming source_id:
   search existing storage entries for assignments with source_id and sensor_id present in its tag list;
   if found update sensor data of storage entry assigned with source_id,
      [[this is a regular update of sensor data from sources within the sensor's sensing filed]]
   else search existing storage entries for assignments with source_id;
      if found update sensor data of storage entry assigned with source_id and add sensor_id to its tag list,
         [[this is an expansion of the list of relevant sensors, i.e. tag list, for sensor data already reported by some other sensor(s)]];
      else insert sensor data as a new storage entry assigned with source_id and [sensor_id] as its tag list,
         [[this is an expansion on sensor data from a new source, not yet reported by any other sensor; it may be due to a new sensor with a new sensing field or an expansion/shifting of the sensing field of a known sensor]];
Done.

According to an embodiment, the database for a storage entry to be deleted comprises: searching for a storage entry assigned with the sensor identifier in combination with a source identifier being different from all source identifiers of the received data set, if a storage entry assigned with the sensor identifier in combination with a source identifier being different from all source identifiers of the received data set is found, deleting the respective sensor identifier assignment.

A source identifier being different from all source identifiers of the received data set refers to a source identifier being different from all source identifiers of a given sensing event.

This may have the advantage that it allows checking which sensors detect a certain data source, e.g. checking changes of the sensing fields of the sensors. In case a data set is received from a sensor which does not contain any sensor data from a certain source anymore, for which the respective sensor has provided sensor data before, it may be concluded that the respective sensor is not able to see the respective source anymore. This may be due to the fact that the respective source has been removed or that the view of the sensor has been narrowed or shifted such that the sensor is not able to detect any signals originating from the respective source anymore.

Thus, examples may have the advantage that not only the environment of the sensors is monitored using the sensors, but that also the sensors themselves and their behavior is monitored. This may have the advantage that it allows for diagnosing, whether changes of the received sensor data are due to changes of the environment which is observed by the sensors or due to changes of the observing sensors themselves which are providing the information about the environment to be monitored and may thus be seen as information links.

Different reconciliation criterions may be assigned to different sensors taking into consideration their individual reliabilities.

According to an embodiment, a storage entry is to be deleted according to a first predefined criterion, if the assignment of the sensor identifier to the storage entry is deleted.

This criterion may be referred to as a 'deletion first criterion', i.e. as soon as one sensor identifier is deleted, such as the respective sensor does not detect any signals from the respective source anymore, and the complete storage entry is deleted. This criterion is assigned to sensors with a high reliability, such that the absence of any sensor data from the respective source in a data set of the respective sensor is considered to be reliable evidence that the respective source is removed from the environment.

According to an embodiment, the predefined criterion is further based on one or more of the remaining sensor identifiers assigned to the storage entry.

This may have the advantage that not only an absolute reliability of a given sensor is taken into account, but also its relative reliability compared to one or more other sensors. Thereby, not only information provided by a single sensor, but by a plurality of sensors as well as the detection history of a source assigned to a storage entry may be taken into account.

According to an embodiment, the number of remaining sensor identifiers assigned to the storage entry is determined according to a second predefined criterion, whereby if the number is smaller than a first threshold value, the storage entry is deleted.

This criterion may be referred to as an 'n-checked delete criterion'. This criterion resembles a lower reliability of the sensor from which a data set without sensor data of a certain source is received for which source the respective sensor has provided sensor data before. This criterion may be assigned to sensors which, due to their lower level of reliability, may not detect input signals from a source even though the source is still present. This may be due to a malfunction of the sensor, a lack of sensitivity of the sensor, or a lack of reliability of the sensing method used by the respective sensor. As long as a sufficient number of sensors are left, which, according to the latest data sets received for the respective sensors, still detect sensor data from the respective source, it may be trusted that the sensor data stored in the database is still valid.

According to an embodiment, the first threshold value is 1.

This criterion may be referred to as a 'delete last criterion'. It requires that, according to the recordings of the database, no sensor is left which detects the respective data source from which the respective sensor data originates. If this is the case, it is concluded that the respective source is gone and the corresponding storage entry is deleted. This criterion may be chosen for highly unreliable sensors or as long as a sensor identifier of a sensor is left which compared to the other sensors is considerably more reliable.

Thus, the present invention allows deleting storage entries, thereby restricting the amount of data stored in the database. This may prevent an unhindered increase of the stored data volume over time. In particular, the database is prevented from keeping obsolete data. This is in particular advantageous compared to a method performing data additions/updates only.

According to an example, outdated sensor data may be deleted according to the following algorithm:
Select all storage entries assigned with sensor_id.
For each existing source_id assigned to a selected storage entry:
 search received data set for existing source_id;
 if not found,
  OPTION A: delete the storage entry together with the assignments of the source identifier and all sensor identifiers,
   [[delete first criterion—deletes the storage entry as soon as any sensor reports that the respective data source is gone]];
  OPTION B: remove the sensor_id from the tag list of the respective storage entry
   if the tag list is empty delete the storage entry together with the assignment of the source identifier,
    [[delete last criterion—deletes the storage entry only when all sensors that had ever seen sensor data from the respective source have reported, the respective source is gone]];
  OPTION C: remove the sensor_id from the tag list of the respective storage entry
   if tag list contains <n sensor identifiers delete the storage entry together with the assignments of the source identifier and all remaining sensor identifiers,
    [[n-checked delete criterion]];
Done.

When a data set received for a sensor which has previously provided sensor data from a certain source no longer comprises sensor data from the respective source, this may imply:

a) The respective data source has been removed. Thus, other sensors, that have detected the respective data source before, will provide the same result, i.e. no sensor data from the respective source. The database will accurately reflect this change either immediately (delete first criterion) or after several updates (other delete criterions) by not comprising a storage entry anymore with sensor data detected assigned to the respective source.

b) The sensing field of the sensor has been narrowed or shifted. With the delete first criterion, the storage entry with the respective sensor data not provided anymore is first deleted from the database, but will be re-stored again without the sensor identifier of the sensor with narrowed/shifted sensing field after receiving updates from other sensors still detecting the respective source.

With the 'delete last criterion' the respective storage entry is kept as long as there is any sensor remaining detecting the respective source. Only the number of sensor identifiers assigned the respective storage entry is reduced.

The 'n-checked delete criterion' provides some configurable middle ground between the delete first and delete last criterion.

c) The sensing fields of all sensors that have previously detected sensor data from the respective source have been narrowed or shifted such that none of the sensor may detect sensor data from the respective source anymore. Thus, the respective storage entry will be eventually deleted from the database no matter which criterion is used.

Each sensor may be assigned with a specific deletion criterion depending on how reliable the sensor is. Selection of the deletion criterion may depend on:
 how reliable and accurate a sensor is, and
 whether it provides sensor data on a regular basis.
Both aspects may be comprised, when referring to the 'reliability' of a sensor.

For instance, with a highly, e.g. 100%, reliable sensor a delete first policy may be preferred. On the other hand, for unreliable but frequently reporting sensors, the 'n-checked delete criterion' or 'delete last criterion' may be preferred.

These criteria may even be combined with each other. For example a certain sensor may be assigned with the 'n-checked delete criterion' as well as the 'delete last criterion', which criterion to be applied may be defined case specific depending on the reliability of the remaining sensors. In case the remaining sensor identifiers may identify sensors with low reliability, the 'n-checked delete criterion' may be applied. In case that the remaining sensor identifiers identify one or more sensors with high reliability, the criterion may be modified such that even though less than n sensors remain, the respective storage entry is not deleted.

According to an embodiment, each sensor identifier is assigned with a weighting factor, according to a third predefined criterion the sum of the weighting factors of the remaining sensor identifiers assigned to the storage entry is determined, if the sum is smaller than a second threshold value, the storage entry is deleted.

This may have the advantage that the reliability of the remaining sensors may be precisely taken into account and the respective search entry only be deleted in case that the remaining sensors, due to their low overall reliability, are not sufficient evidence for the presence of the data source of the respective sensor data.

According to one example, the criterion may furthermore take into account for each of the sensors the interval of time which has been passed since the last data set of the respective sensor with a remaining sensor identifier has been received. In case a remaining sensor has a high sensitivity, but no data has been received from the respective sensor for a long time, this may be an indication that the assignment of the respective sensor identifier is outdated. In other words, if the respective sensor provided a data set at that very moment, the probability is high that the respective data set would comprise no sensor data from the respective source.

According to an example, a request is sent in case no data set has been received from the respective sensor for a predefined interval of time, the request requesting to send a data set. This may have the advantage that it allows checking, whether the information regarding the respective sensor data stored in the database is still up to date.

According to an embodiment, the method further comprising: receiving a zero data set for one or more of the sensors, each zero data set comprising a sensor identifier identifying one of the sensors, but neither sensor data nor source identifier, for each of the received zero data sets: searching the database for storage entries assigned with the respective sensor identifier and, for each entry found, deleting the respective sensor identifier assignment, checking whether the storage entry is to be deleted according to a predefined criterion based on the reliability of the sensor identified by the respective sensor identifier, and if the storage entry is to be deleted according to the criterion, deleting the storage entry.

This may have the advantage that even negative reports explicitly indicating the absence of a source previously seen may be taken into account. Thus, even the total absence of any input signal detected by the respective sensor may be reported. In case sensor data has been received from the respective sensor before, the disappearance of the respective sources seen before may be determined.

According to an example, the deletion criterion may be selected based on the fact whether for a sensor a data set comprising sensor data is received. In case a data set comprising any sensor data is received, the 'delete first criterion' may be selected. In case only a zero data set, i.e. a data set comprising no sensor data at all is received, the 'n-checked delete criterion' or 'delete last criterion' may be selected. In case a sensor with a high sensitivity does not report any sensor data at all anymore, this may be an indication of a malfunction. While as long as a sensor reports any sensor data, there is a high probability that the respective sensor is at least partially working correct.

Sensor data for a sensor may for example be received periodically. In case a source is removed, a zero data set comprising neither any sensor data from the respective source nor the source identifier of the respective source may be received. Based on the absence of any sensor data originating from the respective source for which sensor data has been received and stored before, it may be concluded that the respective source is removed and the respective sensor data stored in the database is not correct anymore.

According to an embodiment, one or more of the received data sets comprises a plurality of sensor data from a plurality of sources and a source identifier for each sensor data identifying the source of the respective sensor data.

This may have the advantage that sensor data from a plurality of sources may be received in an efficient way, thus accelerating the data storing and reconciling. A data set may comprise all sensor data detected by a sensor during a given sensing event as well as the source identifiers of the sources of all the sensor data, each of the plurality of sensor data being assigned with one of the source identifier identifying the source of the respective sensor data.

Storing the sensor data of a data set comprising a plurality of sensor data from a plurality of sources may comprise storing each sensor data in a storage entry of the database in association with the source identifier identifying the source of the respective sensor data and the sensor identifier, resulting in a plurality of storage entries with a storage entry for each source identified by a source identifier of the received data set, each resulting storage entry comprising the sensor data from the source identified by the source identifier assigned to the respective storage entry.

According to an embodiment, assigning the source identifier to the storage entry comprises storing the source identifier in the storage entry.

According to an embodiment, assigning the sensor identifier to the storage entry comprises storing the sensor identifier in the storage entry.

This may have the advantage that, when moving the respective storage entry within the database, exporting the storage entry and/or copying the storage entry, the respective source identifier as well as the sensor identifiers are moved and/or copied together with the storage entry without requiring additional measures.

According to an example, the storage entry may comprise one or more pointers pointing to the storage place of the source identifier and/or the sensor identifiers associated with the respective storage entry.

This may have the advantage that by using pointers the amount of data stored may be further reduced. Furthermore, this may have the advantage that, when moving the respective storage entry within the database, exporting the storage entry and/or copying the storage entry, the amount of data to be handled is reduced.

According to an embodiment, for one or more of the sensors the source identifiers comprised by the repetitively received data sets vary.

This may have the advantage that not only an environment is monitored, wherein the input signals from a constant set of sources may vary over time, but wherein also new sources occur and disappear. Furthermore, sensors with varying sensing fields due to variations of the sensor settings may be taken into account.

According to an embodiment, the sensors for which data sets are repetitively received vary over time.

This may have the advantage that a varying set of sensors may be used. It furthermore provides the possibility to change the number of sensors, for example due to a malfunction of one or more sensors or the usages of additional sensors being temporarily available.

According to an embodiment, each sensor is a server computer program application of a server computer system using an application layer network protocol for monitoring client computer systems communicating with the server computer system over a network.

This may have the advantage that the method may be used to monitor the state of a complex infrastructure of a plurality of computer systems based on a client server structure, which is dynamically changing over time. Thus, it may be efficiently determined whether and which computer systems are currently participating in a network.

According to an embodiment, the sensor identifiers are application layer network protocol identifiers.

This may have the advantage that a plurality of application layer network protocols may be used to precisely determine which computer systems are currently participating in a network.

According to an embodiment, the source identifiers are network addresses.

This may have the advantage that the computer systems for which certain sensor data is detected may be efficiently and effectively identified. The network address may for example be an IP address or an MAC address.

According to embodiments, the sensor data being network interface status values.

This may have the advantage that the method may be used to monitor which computer systems are temporarily participating in a network, e.g. a business network of a large company. The respective information may be used for controlling the system, improving the performance, error detection/diagnosing and/or troubleshooting.

FIG. 1 shows a schematic diagram of an exemplary arrangement with a plurality of sensors providing sensor data to a database 100 for which the present method may be used. The environment 150 is monitored by four sensors.

Each of the sensors has a different sensing field. Each sensing field covers a part of the environment 150. Sensor 1 has sensing field 152, sensor 2 sensing field 154, sensor 3 sensing field 156, and sensor 4 sensing field 158. Sensing fields 152 and 154 as well as sensing fields 158 and 154 partially overlap, i.e. partially comprise the same sources. Furthermore, sensing field 154 is entirely comprised by sensing field 152. Each of the sensors provides sensor data of its sensing field to a database 100, which receives the sensor data provided by the sensors.

Figure 2:
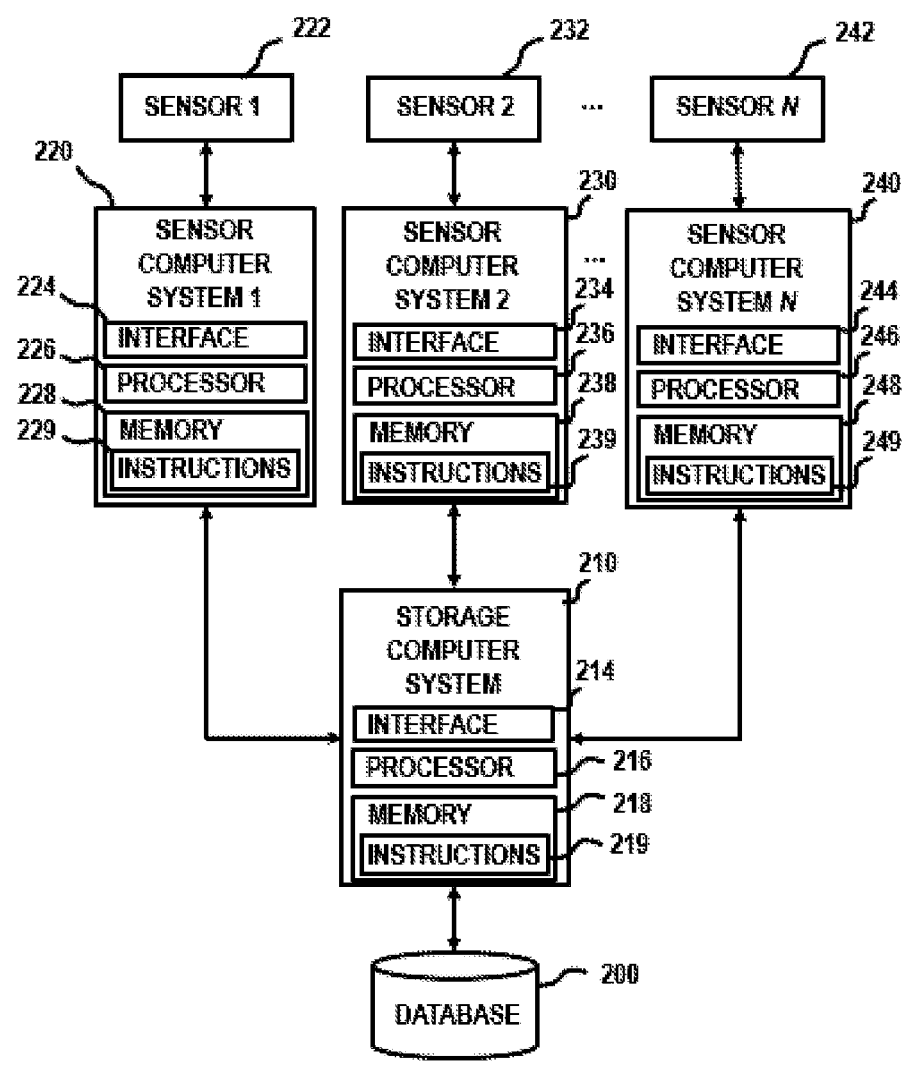
FIG. 2 depicts a schematic diagram illustrating an exemplary arrangement of computer systems for storing and reconciling in a database sensor data.

FIG. 2 shows a schematic diagram of an exemplary arraignment of computer systems which may be used for executing the data storing and reconciling method according to the present invention. In FIG. 2 exemplary sensors 222, 232 and 242 are shown. Each sensor is configured to receive input signals from signal sources of their environment and convert the input signals into output signals which are provided to sensor computer systems 220, 230, 240. The sensors and sensor computer systems may be provided as one unit or they may be provided as different units connected wireless or by a wire. Each sensor computer system 220, 230, 240 may comprise an interface 224, 234, 244 for communication with a storage computer system 210. The sensor computer systems 220, 230 and 240 may be connected directly to the storage computer system 210 or via a network. Each sensor computer system 220, 230, 240 may further comprise a processor 226, 236, 246 for executing machine executable instructions 229, 239, 249 stored in a memory 228, 238, 248. Execution of the machine executable instructions 229, 239, 249 may cause the processor 226, 236, 246 to control the sensor computer system 220, 230, 240 to receive sensor data from the sensors 222, 232, 242 and send data sets to the storage computer system 210 comprising the received sensor data, a sensor identifier identifying the sensor 222, 232, 242 from which the sensor data originates as well as a source identifiers identifying the source of each sensor data provided by the data set.

The storage computer system 210 may comprise an interface 244 communicating with the sensor computer systems 220, 230, 240. The storage computer system 210 is connected with a database 200. The database may be part of the storage computer system 210 or it may be provided in form of a separate unit being connected with the storage computer system 210 wireless or by a wire. The storage computer system 210 may further comprise a memory 218 with machine-executable instructions 219 stored therein as well as a processor 216 for executing the machine-executable instructions 219. Execution of the machine-executable instructions 219 causes the processor 216 to control the storage computer system and the database 200 by executing a method for storing and reconciling sensor data from a plurality of sensors 222, 232, 242. The storage computer system 210 repetitively receives data sets from the sensor computer systems 220, 230, 240. The data sets at least comprise a sensor identifier identifying the sensor, i.e. are at least zero data sets. The data sets may further comprise sensor data and a source identifier identifying the source of the sensor data. The sensor data and the source identifiers may e.g. be received in different messages from the sensor computer systems 220, 230, 240. According to an embodiment the sensor data and source identifiers may even be received from different sensor computer systems, i.e. a sensor may be connected with different sensor computer systems. When a data set comprising sensor data is received by the storage computer system 210, the processor 216 executing the machine-executable instructions 219 controls the database 200 such that the respective sensor data is stored in a storage entry of the database 200 in association with the received sensor identifier and source identifier.

Furthermore, execution of the machine-executable instructions 219 via the processor 216 of the storage computer system 210 causes the processor 216 to search the database 200 for a storage entry to be deleted according to a predefined criterion based on the reliability of the sensor identified by the received sensor identifier using the sensor data and the source identifier comprised by the data set. In case a storage entry to be deleted according to the criterion is found, sensor 216 causes the deletion of the respective storage entry in the database 200.

Figure 3:
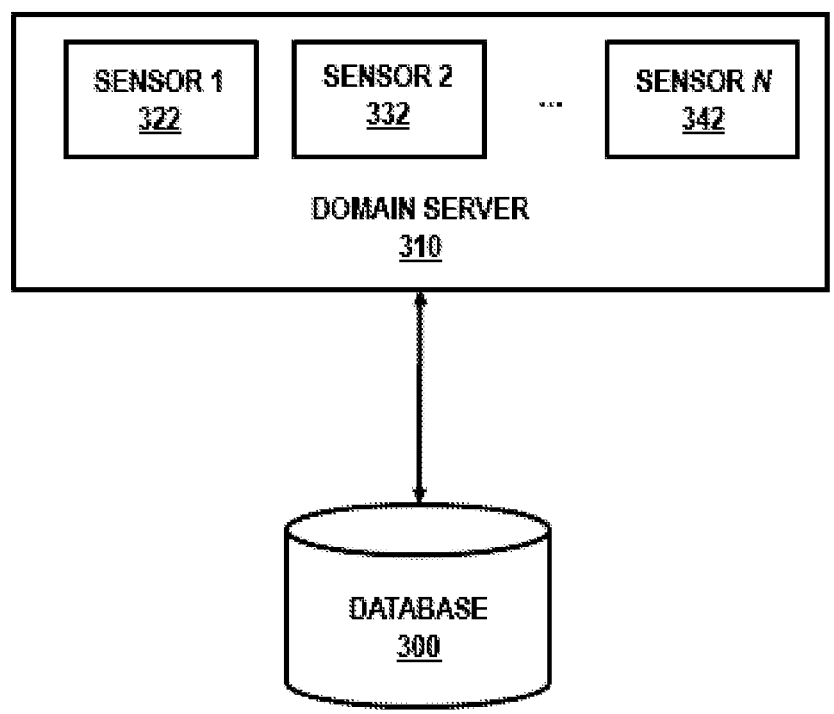
FIG. 3 depicts a schematic diagram illustrating a first exemplary arrangement of servers for storing and reconciling in a database sensor data.

FIG. 3 depicts an exemplary arrangement, wherein the sensors 322, 332, 342 are comprised by a domain server 310, which is connected to a database 300. A domain may be a logical subset of the infrastructure of a company or other organization. Domains can delineate organizational, functional, or geographical boundaries. The domain server 310 runs sensors 322, 332, 342 that discover data about the respective domain. Therein, the domain server 310 may monitor with the sensors 322, 332, 342 a network or a predefined portion of a network or computer system. The sensor data detected by the sensors 322, 332, 342 is provided to the database 300 by the domain server 310 in form of data sets comprising the detected sensor data, sensor identifier and source identifier.

Figure 4:
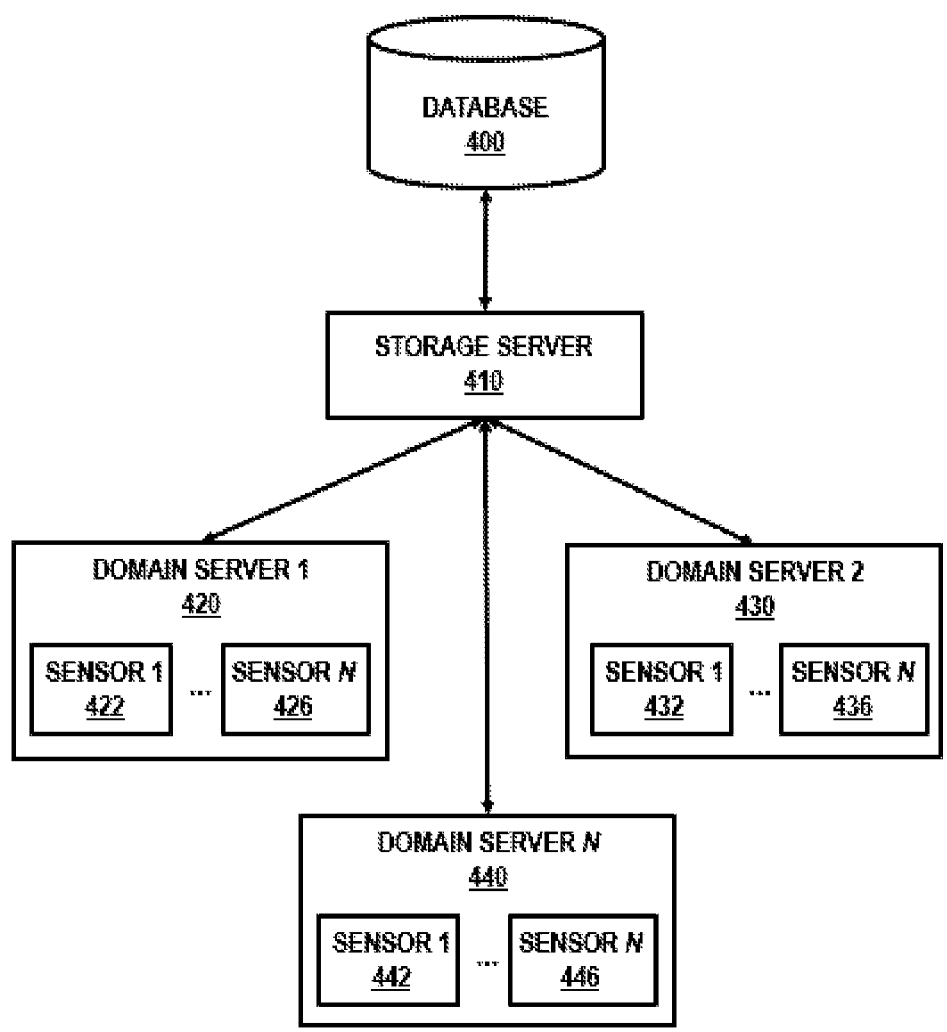
FIG. 4 depicts a schematic diagram illustrating a second exemplary arrangement of servers for storing and reconciling in a database sensor data.

FIG. 4 shows a third exemplary embodiment, wherein a plurality of domain servers 420, 430, 440 with sensors 422, 426; 432, 436; 442, 446 are provided. When deploying more than one domain server, a streaming server deployment may be used. During discovery, data flows in parallel or streams from multiple discovery servers, i.e. domain servers 420, 430, 440, to the primary storage server 410, where the data is processed and stored in the database 400. Only the primary storage server 410 may have a database 400.

Discovery servers 420, 430, 440 are used only for running sensors 422, 426; 432, 436; 442, 446 and therefore do not have a database 400. Each domain server 420, 430, 440 may monitor a portion of a network or computer system. The portions may be different from each other or fully or partially overlapping. The domain services 420, 430, 440 are connected with a storage server 410, which is connected with a database 400. The storage server 410 receives data sets from the domain servers 420, 430, 440. The storage server 410 performs the data storage method for reconciling sensor data received from sensors 422, 426; 432, 436; 442, 446.

This type of deployment may provide the following benefits: Greater availability of data, i.e. in a streaming server deployment, data is available as soon as it is discovered; cost savings, i.e. a streaming server deployment requires less hardware and resources.

In an exemplary embodiment (not depicted), this type of deployment may also include one or more optional secondary storage servers building a storage server pool. The primary storage server and secondary storage servers share the database. The primary storage server may be the coordinator of the storage server pool. Each secondary storage server registers with the primary storage server, and each discovery server is notified when a secondary storage server is added to, or removed from, the storage server pool.

Figure 5:
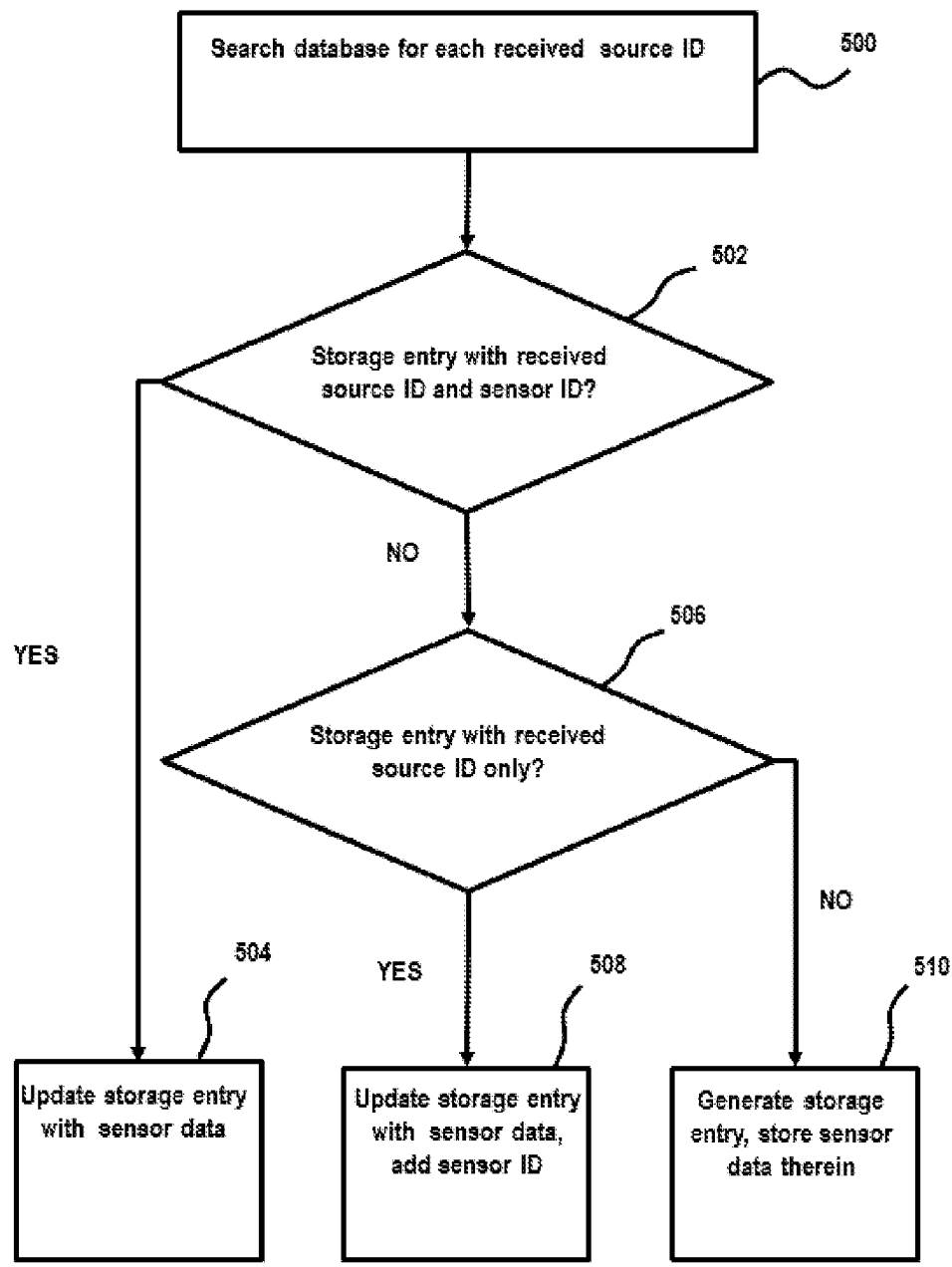
FIG. 5 depicts a schematic flow diagram of a method for storing sensor data in a database.

FIG. 5 depicts a schematic flow diagram of a data storing method. The method is applied for each received source ID, i.e. source identifier. In block 500 the database is searched for the received source ID. In block 502 it is determined whether the database comprises a storage entry assigned with the received source ID and the received sensor ID, i.e.

sensor identifier. In case the database comprises a storage entry in association with the received source ID and sensor ID, the respective storage entry is updated with the received sensor data in block 504. The source identifier and sensor identifier associated with the storage entry, which are identical to the received source identifier and sensor identifier remain unchanged. In case the database is determined to comprise no storage entry which is assigned with the received source ID in combination with the received sensor ID, in block 506 it is checked, whether the database comprises a storage entry which is assigned the received source ID only. In case the database comprises a storage entry which is assigned with the received source ID only, in block 508 the respective storage entry is updated with the received sensor data and the received sensor ID is additionally assigned to the respective storage entry. If it is determined in block 506 that the database does not comprise any storage entry which is associated with the received source ID only, in block 510 a new storage entry is generated and the received sensor data is stored therein in association with the received source ID and the received sensor ID.

Figure 6:
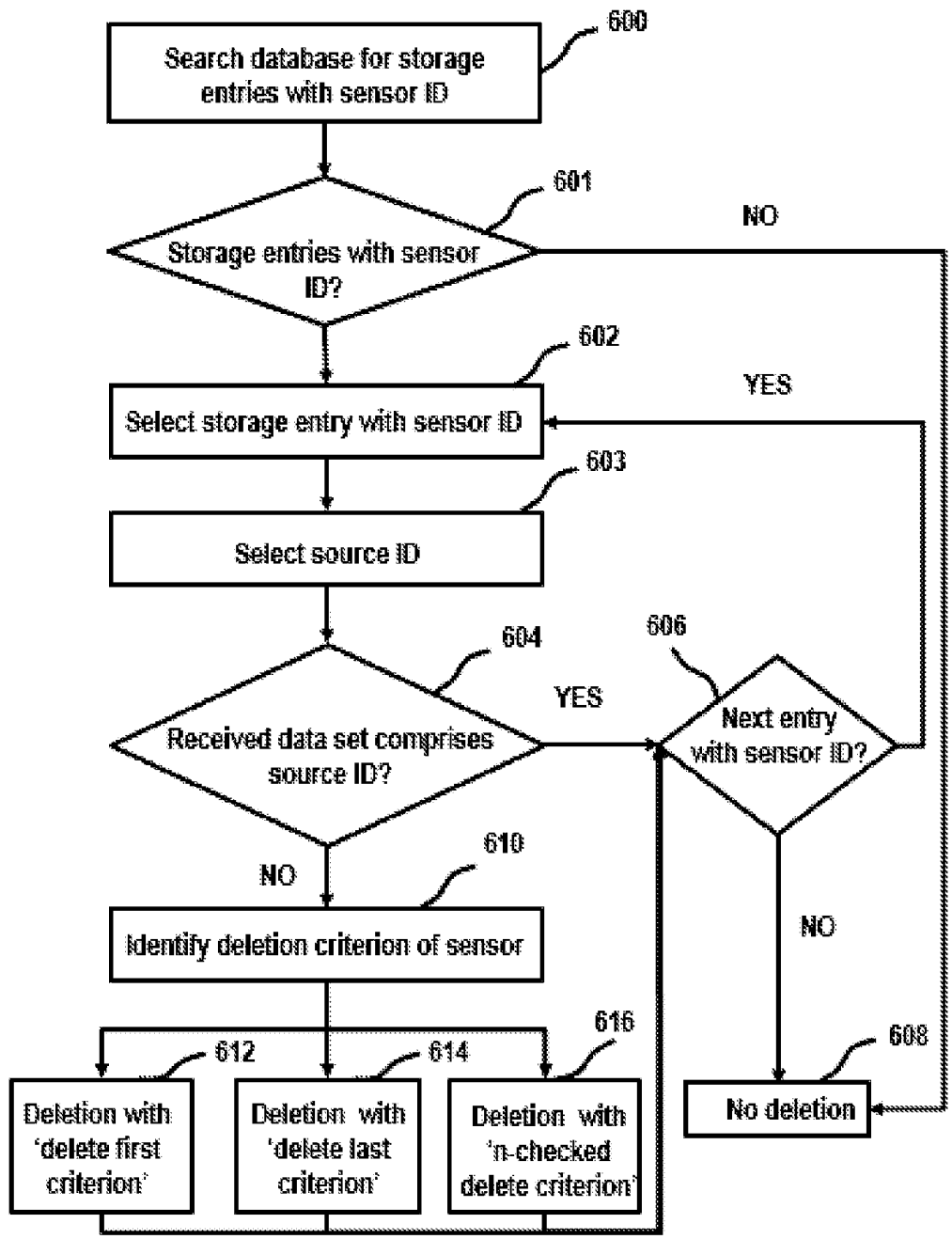
FIG. 6 depicts a schematic flow diagram of a method for deleting sensor data in a database.

FIG. 6 depicts a schematic flow diagram of a deletion method for reconciling a sensor data from a plurality of sensors in a database. In block 600 the database is searched for a storage entry assigned with the received sensor ID. In block 601 it is determined whether the database comprises at least one storage entry assigned with the sensor ID. In case it is determined that the database does not comprise any storage entry assigned with the received sensor ID, no deletion is performed (block 608). In case it is determined in block 601 that the database comprises a storage entry which is assigned with the received sensor ID, the respective storage entry is selected in block 602. In block 603 the source ID of the respective storage entry is selected. In block 604 it is determined whether the received data set comprises the source ID selected in block 603. In case the received data set comprises the selected source ID, in step 606 it is checked whether the database comprises a further storage entry with the received sensor ID. In case the database does comprise a further storage entry with the received sensor ID, the method continues with block 602. In case the database does not comprise any further storage entry with the received sensor ID, no deletion is performed (block 618).

In case in block 604 it is determined that the received data set does not comprise the source ID selected in block 603, i.e. during the sensing event of the received data set no sensor data has been detected by the respective sensor, in block 610 the deletion criterion assigned to the sensor identified by the received sensor ID is identified. In case the deletion criterion depends on a further parameter like the reliability of the sensors identified by further sensor IDs assigned to the selected storage entry, these further parameters may be additionally taken into account when selecting the deletion criterion to be applied. For example the sum of weighting factors of the further sensors may be calculated. Based on the result of the identification and/or selection, the method continues with block 612, 614 or 616. In block 612 the deletion is performed according to the 'delete first criterion', i.e. the entire storage entry with the assignment of the source identifier as well as all sensor identifiers is deleted. In block 614 the deletion is performed according to the 'delete last criterion', i.e. the assignment of the received sensor ID to the selected storage entry is deleted. In case no further sensor IDs remain assigned to the selected storage entry, the storage entry is additionally deleted together with the assignment of the status source identifier. In block 616 the deletion is performed according to the 'n-checked delete criterion', i.e. again the assignment of the received sensor ID is deleted. In case the number of remaining sensor IDs assigned to the selected storage entry is smaller than a predefined threshold, the storage entry together with the assignment of the source identifier is deleted. Otherwise, the storage entry together with the source identifier and the remaining sensor identifiers is kept.

After the deletion according to any of the deletion criterions 612, 614, 616 the method continues with block 606. In case the database does comprise a further storage entry with the received sensor ID, the method continues with block 602. In case the database does not comprise any further storage entry with the received sensor ID, no (further) deletion is performed (block 618).

The methods depicted in FIG. 5 and FIG. 6 may be further illustrated by the following example: Consider a computer system with a plurality of IP interfaces, which may be detected using a plurality of detection methods. For the purpose of this example these detection methods may be:

SOAP (Simple Object Access Protocol) protocol which is reliable, but only provides a narrowed view of the system, SNMP (Simple Network Management Protocol) protocol which detects most IP interfaces, but is unreliable and may randomly omit interfaces, Hypervisor CLI (command-line interface) which hosts the computer system and may thus be the most reliable source with a complete view of the system.

SOAP is a protocol specification for exchanging structured information in the implementation of web services in computer networks. This specification uses XML Information Set for its message format, and relies on other application layer protocols, like Hypertext Transfer Protocol (HTTP) or Simple Mail Transfer Protocol (SMTP), for message negotiation and transmission.

SNMP is an internet-standard protocol for managing devices on IP networks. Devices that typically support SNMP include for example routers, switches, servers, workstations, printers, modem racks. This protocol specification may be used in network management systems to monitor network-attached devices for conditions that warrant administrative attention. SNMP consists of a set of standards for network management, including an application layer protocol, a database schema, and a set of data objects.

Hypervisors are software or firmware components that can virtualize system resources. A hypervisor may either run directly on the system hardware (Type 1 hypervisor) or on a host operating system that provides virtualization services (Type 2 hypervisor), such as I/O device support and memory management.

Virtualization is the creation of flexible substitutes for actual resources, i.e. substitutes that have the same functions and external interfaces as their actual counterparts but that may differ in attributes such as size, performance, and cost. These substitutes may be referred to as virtual resources.

Virtualization may be applied to physical hardware resources by combining multiple physical resources into shared pools from which users receive virtual resources. With virtualization, one physical resource may be made look like a plurality of virtual resources.

Furthermore, virtual resources may have functions or features that are not available in their underlying physical resources.

System virtualization may create a plurality of virtual systems within a single physical system. Virtual systems are independent operating environments that use virtual resources. Virtual systems may also be referred to as logical partitions or virtual machines. System virtualization may be implemented with hypervisor technology.

A hypervisor or virtual machine monitor (VMM) is a piece of computer software, firmware or hardware that creates and runs virtual machines. A computer on which a hypervisor is running one or more virtual machines may be referred to as host machine. Each virtual machine may be called a guest machine. The hypervisor presents the guest operating systems with a virtual operating platform and manages the execution of the guest operating systems. A plurality of instances of a plurality of operating systems may share the virtualized hardware resources.

Each virtual system instance may consist of a set of virtual machines that represent a physical node in an application server environment. These virtual machines are assigned to and hosted by a hypervisor. The individual virtual machines may be accessed by a command-line interface (CLI).

CLI is an interface for interacting with a computer program, wherein commands are issued to the program in the form of successive lines of text, so-called command lines.

For example, the following sequence of storing and reconciling data coming from the above identified exemplary sensors, i.e. SOAP, SNMP, and Hypervisor CLI, may be considered for illustrative purposes:

From a sensor using SOAP, the following incoming tabular data set may be provided:

| Source identifier | Description | Status |
|---|---|---|
| 9.42.117.60 | public address | UP |

This may result in the following storage entry in a tabular structured database:

| Source identifier | Description | Status | SOAP | Hypervisor | SNMP |
|---|---|---|---|---|---|
| 9.42.117.60 | public address | UP | X | | |

Since this is the first time sensor data is stored, so only an insert operation is executed. In this case one row is written.

The sensor is identified by the protocol used for sensing, i.e. SOAP. The detected sensor data is the network interface status value 'UP' and the source for which the sensor data is detected, i.e. the network interface which status value is detected, is identified by its interface identifier, i.e. source identifier. The storage entry further comprises a description of the source identifier, i.e. 'public address'.

From a sensor using a hypervisor, the following incoming data set may be provided:

| Source identifier | Description | Status |
|---|---|---|
| 9.42.117.60 | public address | DOWN |
| 16.11.160.1 | special IP visible only to hypervisor | UP |
| 16.11.160.177 | private address | UP |
| 16.11.160.178 | private address | UP |
| 2000:16:11:160:0:0:0:177 | private address IPv6 | UP |
| 2000:16:11:160:0:0:0:178 | private address IPv6 | UP |

This may result in the following storage entries in the database:

| Source identifier | Description | Status | SOAP | Hypervisor | SNMP |
|---|---|---|---|---|---|
| 9.42.117.60 | public address | DOWN | X | X | |
| 16.11.160.1 | special IP visible only to hypervisor | UP | | X | |
| 16.11.160.177 | private address | UP | | X | |
| 16.11.160.178 | private address | UP | | X | |
| 2000:16:11:160:0:0:0:177 | private address IPv6 | UP | | X | |
| 2000:16:11:160:0:0:0:178 | private address IPv6 | UP | | X | |

No delete operations have been performed, since it is the first time sensor data from the hypervisor sensor is stored. One update has been performed: the status value of the interface 9.42.117.60 has been updated from 'UP' to 'DOWN' and the list of sensor identifiers has been extended by the hypervisor sensor. Furthermore, five inserts have been performed for the newly detected status of the interfaces 16.11.160.1, 16.11.160.177, 16.11.160.178, 2000:16:11:160:0:0:0:177, and 2000:16:11:160:0:0:0:178.

From a sensor using SNMP, the following incoming data set may be provided:

| Source identifier | Description | Status |
|---|---|---|
| 9.42.117.60 | public address | UP |
| 16.11.160.177 | private address | UP |
| 16.11.160.178 | private address | UP |

This may result in the following storage entries in the database:

| Source identifier | Description | Status | SOAP | Hypervisor | SNMP |
|---|---|---|---|---|---|
| 9.42.117.60 | public address | UP | X | X | X |
| 16.11.160.1 | special IP visible only to hypervisor | UP | | X | |
| 16.11.160.177 | private address | UP | | X | X |
| 16.11.160.178 | private address | UP | | X | X |
| 2000:16:11:160:0:0:0:177 | private address IPv6 | UP | | X | |
| 2000:16:11:160:0:0:0:178 | private address IPv6 | UP | | X | |

Again no delete operations are performed, since sensor data is provided by the SNMP sensor for the first time. Only updates are performed, no new storage entries, i.e. rows, are added: The status value of interface 9.42.117.60 is updated from 'DOWN' to 'UP'. Furthermore, SNMP is added to the list of sensor identifier for three rows.

Next, examples for different deletion operations will be shown. First, an example illustrating the 'delete first criterion' will be given. Then, two examples illustrating the 'delete last criterion' will be given:

From the sensor using SNMP, the following incoming data set may be provided:

| Source identifier | Description | Status |
|---|---|---|
| 9.42.117.60 | public address | UP |

For the 'delete first criterion', this may result in the following storage entries in the database:

| Source identifier | Description | Status | SOAP | Hypervisor | SNMP |
|---|---|---|---|---|---|
| 9.42.117.60 | public address | UP | X | X | X |
| 16.11.160.1 | special IP visible only to hypervisor | UP | | X | |
| 2000:16:11:160:0:0:0:177 | private address IPv6 | UP | | X | |
| 2000:16:11:160:0:0:0:178 | private address IPv6 | UP | | X | |

With the 'delete first criterion' all storage entries, i.e. rows, assigned with the sensor identifier of the SNMP sensor, i.e. with the 'SNMP' tag, with source identifiers which are not comprised by the incoming data set are deleted, i.e. 16.11.160.177 and 16.11.160.178, even though they had the 'hypervisor' tag as well. Note that rows without the 'SNMP' tag are skipped during the delete phase.

Next, the same situation is considered with the following incoming data set from the SNMP sensor:

| Source identifier | Description | Status |
|---|---|---|
| 9.42.117.60 | public address | UP |

For the 'delete last criterion', this may result in the following storage entries in the database:

| Source identifier | Description | Status | SOAP | Hypervisor | SNMP |
|---|---|---|---|---|---|
| 9.42.117.60 | public address | UP | X | X | X |
| 16.11.160.1 | special IP visible only to hypervisor | UP | | X | |
| 16.11.160.177 | private address | UP | | X | |
| 16.11.160.178 | private address | UP | | X | |
| 2000:16:11:160:0:0:0:177 | private address IPv6 | UP | | X | |
| 2000:16:11:160:0:0:0:178 | private address IPv6 | UP | | X | |

Contrary to the 'delete first criterion' considered before, with the 'delete last criterion' the storage entries with the source identifier 16.11.160.177 and 16.11.160.178 are not deleted as they have additional sensor tags, i.e. 'hypervisor'. The only modification is the removal of the 'SNMP' tag from the respective rows.

From the sensor using a hypervisor, the following incoming data set may be provided:

| Source identifier | Description | Status |
|---|---|---|
| 9.42.117.60 | public address | UP |
| 16.11.160.1 | special IP visible only to hypervisor | UP |
| 16.11.160.177 | private address | UP |
| 2000:16:11:160:0:0:0:177 | private address IPv6 | UP |

For the 'delete last criterion', this may result in the following storage entries in the database:

| Source identifier | Description | Status | SOAP | Hypervisor | SNMP |
|---|---|---|---|---|---|
| 9.42.117.60 | public address | UP | X | X | X |
| 16.11.160.1 | special IP visible only to hypervisor | UP | | X | |
| 16.11.160.177 | private address | UP | | X | |
| 2000:16:11:160:0:0:0:177 | private address IPv6 | UP | | X | |

The storage entries with 16.11.160.178 and 2000:16:11:160:0:0:0:178 are deleted as the respective source identifiers are not present in the incoming data set and 'hypervisor' was the last sensor tag remaining of these storage entries.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for deleting a storage entry associated with a plurality of sensors, the method comprising:
    repetitively receiving data sets for each sensor within the plurality of sensors, each data set comprising sensor data detected by a respective sensor within one of the plurality of sensors from a source during a sensing event, wherein a source identifier identifies the source, a sensor identifier identifies the respective sensor within the plurality of sensors, and wherein the sensor identifiers of at least two of the received data sets are different from each other, while both data sets comprise the same source identifier, and for each of the received data sets:
    storing the sensor data comprised by the data set in a storage entry of the database in association with the source identifier and the sensor identifier;
    searching the database for each sensor associated with the storage entry using the sensor data, the source identifier, and one or more sensor identifiers;
    determining whether to delete the storage entry and an assignment of at least one sensor identifier to the storage entry according to a predefined criterion based on a reliability of each searched for sensor within the plurality of sensors and based on a threshold number of sensors associated with the storage entry; and
    wherein searching the database for the storage entry to be deleted comprises searching for the storage entry assigned with the sensor identifier in combination with the source identifier being different from the source identifiers of the received data set, and when the storage entry assigned with the sensor identifier in combination with the source identifier being different from the source identifiers of the received data set is found, deleting the respective sensor identifier assignment.

2. The computer-implemented method of claim 1, wherein storing the sensor data comprises:
    searching the database for the storage entry assigned with the source identifier;
    when no storage entry assigned with the source identifier is found, generating a new storage entry, the sensor data being stored in the new storage entry, and the source identifier and the sensor identifier being assigned to the new storage entry;
    when a storage entry assigned with the source identifier is found, checking whether the respective storage entry is assigned with the sensor identifier;
    when the storage entry is assigned with the sensor identifier, updating the respective storage entry with the sensor data; and
    when the respective storage entry is not assigned with the sensor identifier, updating the respective storage entry with the sensor data and adding an assignment of the sensor identifier to the updated storage entry.

3. The computer-implemented method of claim 1, wherein according to a first predefined criterion the storage entry is to be deleted when the assignment of the sensor identifier to the storage entry is deleted.

4. The computer-implemented method of claim 1, wherein the predefined criterion is further based on one or more of the remaining sensor identifiers assigned to the storage entry.

5. The computer-implemented method of claim 4, wherein according to a second predefined criterion, the number of remaining sensor identifiers assigned to the storage entry is determined, and when the number is smaller than a first threshold value, the storage entry is deleted.

6. The computer-implemented method of claim 5, wherein the first threshold value is 1.

7. The computer-implemented method of claim 4, wherein each sensor identifier is assigned with a weighting factor, and according to a third predefined criterion, the sum of the weighting factors of the remaining sensor identifiers assigned to the storage entry is determined, and when the sum is smaller than a second threshold value, the storage entry is deleted.

8. The computer-implemented method of claim 1, further comprising:
    receiving a zero data set for one or more of the plurality of sensors, each zero data set comprising the sensor identifier identifying one of the sensors, but neither sensor data nor source identifier, and for each of the received zero data sets, searching the database for storage entries assigned with the respective sensor identifier, wherein for each entry found:
    deleting the respective sensor identifier assignment;
    checking whether the storage entry is to be deleted according to a predefined criterion based on a reliability of the sensor identified by the respective sensor identifier; and
    when the storage entry is to be deleted according to the criterion, deleting the storage entry.

9. The computer-implemented method of claim 1, wherein one or more of the received data sets comprises a plurality of sensor data from a plurality of sources and a source identifier for each sensor data identifying the source of the respective sensor data.

10. The computer-implemented method of claim 1, wherein assigning the source identifier to the storage entry comprises storing the source identifier in the storage entry.

11. The computer-implemented method of claim 1, wherein assigning the sensor identifier to the storage entry comprises storing the sensor identifier in the storage entry.

12. The computer-implemented method of claim 1, wherein for one or more of the plurality of sensors, the source identifier is comprised by the repetitively received data sets vary.

13. The computer-implemented method of claim 1, wherein the plurality of sensors for which data sets are repetitively received vary over time.

14. The computer-implemented method of claim 1, wherein each of the plurality of sensors are a server computer program application of a server computer system using an application layer network protocol for monitoring client computer systems communicating with the server computer system over a network.

15. The computer-implemented method of claim 14, wherein the plurality of sensor identifiers are application layer network protocol identifiers.

16. The computer-implemented method of claim 14, wherein the source identifiers are network addresses.

17. The computer-implemented method of claim 14, wherein the sensor data is network interface status values.

18. A computer system for deleting a storage entry associated with a plurality of sensors, the system comprising:
    a database,
    a memory with machine executable instructions stored therein, and
    a processor for executing the machine executable instructions, wherein execution of the machine executable instructions by the processor causes the processor to control the database by executing a data storing and reconciling method, the method comprising:
    repetitively receiving data sets for each sensor within the plurality of sensors, each data set comprising sensor data detected by a respective sensor within one of the plurality of sensors from a source during a sensing event, wherein a source identifier identifies the source, a sensor identifier identifies the respective sensor within the plurality of sensors, and wherein the sensor identifiers of at least two of the received data sets are different from each other, while both data sets comprise the same source identifier, and for each of the received data sets:
    storing the sensor data comprised by the data set in a storage entry of the database in association with the source identifier and the sensor identifier;
    searching the database for each sensor associated with the storage entry using the sensor data, the source identifier, and one or more sensor identifiers;
    determining whether to delete the storage entry and an assignment of at least one sensor identifier to the storage entry according to a predefined criterion based on a reliability of each searched for sensor within the plurality of sensors and based on a threshold number of sensors associated with the storage entry; and
    wherein searching the database for the storage entry to be deleted comprises searching for the storage entry assigned with the sensor identifier in combination with the source identifier being different from the source identifiers of the received data set, and when the storage entry assigned with the sensor identifier in combination with the source identifier being different from the source identifiers of the received data set is found, deleting the respective sensor identifier assignment.

19. A computer program product for deleting a storage entry associated with a plurality of sensors, the computer program product comprising a computer readable storage medium having machine executable instructions embodied therewith, the machine executable instructions being executable by a processor to cause the processor to control a database according to a data storing and reconciling method, the method comprising:
    repetitively receiving data sets for each sensor within the plurality of sensors, each data set comprising sensor data detected by a respective sensor within one of the plurality of sensors from a source during a sensing event, wherein a source identifier identifies the source, a sensor identifier identifies the respective sensor within the plurality of sensors, and wherein the sensor identifiers of at least two of the received data sets are different from each other, while both data sets comprise the same source identifier, and for each of the received data sets:
    storing the sensor data comprised by the data set in a storage entry of the database in association with the source identifier and the sensor identifier;
    searching the database for each sensor associated with the storage entry using the sensor data, the source identifier, and one or more sensor identifiers;
    determining whether to delete the storage entry and an assignment of at least one sensor identifier to the storage entry according to a predefined criterion based on a reliability of each searched for sensor within the plurality of sensors and based on a threshold number of sensors associated with the storage entry; and wherein searching the database for the storage entry to be deleted comprises searching for the storage entry assigned with the sensor identifier in combination with the source identifier being different from the source identifiers of the received data set, and when the storage entry assigned with the sensor identifier in combination with the source identifier being different from the source identifiers of the received data set is found, deleting the respective sensor identifier assignment.

\* \* \* \* \*